US 8,593,750 B2

(12) United States Patent
Shibano

(10) Patent No.: US 8,593,750 B2
(45) Date of Patent: Nov. 26, 2013

(54) MAGNETIC STORAGE MEDIUM, INFORMATION STORAGE DEVICE, AND CONTROL DEVICE

(75) Inventor: Motomichi Shibano, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 940 days.

(21) Appl. No.: 12/715,218

(22) Filed: Mar. 1, 2010

(65) Prior Publication Data

US 2010/0220409 A1 Sep. 2, 2010

(30) Foreign Application Priority Data

Mar. 2, 2009 (JP) ................................. 2009-048556

(51) Int. Cl.
*G11B 7/24* (2013.01)
(52) U.S. Cl.
USPC .......................................................... 360/55
(58) Field of Classification Search
USPC .......................................................... 360/55
See application file for complete search history.

(56) References Cited

U.S. PATENT DOCUMENTS

| | | | |
|---|---|---|---|
| 7,889,450 B2* | 2/2011 | Vikramaditya et al. | 360/51 |
| 7,911,724 B2* | 3/2011 | Buch et al. | 360/51 |
| 7,948,707 B2* | 5/2011 | Kim | 360/77.08 |
| 7,969,676 B2* | 6/2011 | Buch et al. | 360/31 |
| 8,077,416 B2* | 12/2011 | Sakurai et al. | 360/48 |
| 2010/0118429 A1* | 5/2010 | Vikramaditya et al. | 360/51 |

FOREIGN PATENT DOCUMENTS

| | | |
|---|---|---|
| JP | 06-060429 A | 3/1994 |
| JP | 2003-157631 A | 5/2003 |

OTHER PUBLICATIONS

Decision of a Patent Grant mailed by the Japan Patent Office on Apr. 5, 2011 in the corresponding Japanese patent application No. 2009-048556.

* cited by examiner

*Primary Examiner* — Mark Blouin
(74) *Attorney, Agent, or Firm* — Knobbe, Martens, Olson & Bear LLP

(57) ABSTRACT

According to one embodiment, a magnetic storage medium, includes a magnetic recording layer that includes: a servo area including predetermined servo information; a user data area including predetermined user information; two preamble areas including a plurality of magnetic bodies made of magnetic particles, the magnetic bodies being arranged in a staggered pattern so that the staggered pattern is inverted with respect to an axis of symmetry at a track center; and a re-sync mark area positioned at a head of the preamble areas and indicates a start of the preamble areas.

8 Claims, 12 Drawing Sheets

MAGNETIC STORAGE MEDIUM, INFORMATION STORAGE DEVICE, AND CONTROL DEVICE

CROSS-REFERENCE TO RELATED APPLICATIONS

This application is based upon and claims the benefit of priority from Japanese Patent Application No. 2009-048556, filed Mar. 2, 2009, the entire contents of which are incorporated herein by reference.

BACKGROUND

1. Field

One embodiment of the invention relates to a magnetic storage medium, an information storage device, and a control device.

2. Description of the Related Art

In recent years, information storage devices such as a hard disk drive (HDD) have been desired to have a high recording density, due to a high transmission rate or an increase in capacity of a magnetic storage medium used in the information storage devices.

Accordingly, various recording methods, such as a discrete track recording method or a patterned media recording method (also referred to as bit patterned media (BPM)) for realizing high recording density in the magnetic storage medium have been suggested. The discrete track recording method forms non-magnetic areas between adjacent tracks and records data only in track portions formed by magnetic bodies. The patterned media recording method isolates each of the magnetic particles to produce a single bit pattern, thereby improve a record resolution.

The patterned media have high recording density. The patterned media corresponds to a magnetic recording medium on which magnetic areas are separated and isolated from each other by non-magnetic areas. Here, the magnetic areas are areas where data is written to and read out from. A plurality of magnetic dots can be disposed in the patterned media. The recording density of the patterned media can be improved by increasing the number of the magnetic dots.

In a common information storage device, a positioning signal is readout from a servo pattern on the medium, and a magnetic head is positioned according to the positioning signal. Further, tracks of magnetic recording medium are formed by forming process such as electron beam lithography and nano-imprint. However, a track oscillation is caused during the forming process. As a result, the magnetic head cannot be accurately positioned using only the information of the servo pattern.

Therefore, conventionally, in order to improve the positioning precision, a reference signal is written in a data recording track, the track oscillation is detected from an amplitude variation of the reproduced reference signal, and feedforward control is performed based on the detected result. However, the process of investigating the track oscillation needs to be executed in advance. That is to say, for example, confirmation becomes necessary whenever disturbance such as a temperature change occurs. Therefore, device performance may be deteriorated.

In order to prevent the deterioration of the device performance, the number of servo areas per track may be increased to increase the amount of servo information to be sampled. Accordingly, a servo control band is increased. However, the increase in the servo areas decreases the data areas, thereby lowers a recording density per unit area.

As the aforementioned kind of positioning control method, a record reading method such as the one disclosed in Japanese Patent Application Publication (KOKAI) No. 2003-157631 has been suggested. This record reading method stores various signal patterns acquired from magnetic dot arrangement. Then, the record reading method compares the signal patterns with track shift signals of when the head position is offset from a central track, and estimates a positioning error amount based on the matched signal pattern and track shift signal.

When writing data by a magnetic head, magnetic dots to be recorded need to be located directly under the magnetic head. That is, it is important to generate a clock signal synchronized with an arrangement pattern of a magnetic body, while predicting positions of the magnetic dots on the magnetic recording medium.

Conventionally, as disclosed in Japanese Patent Application Publication (KOKAI) No. 2003-157631, a shift direction of the magnetic head can be acquired. However, the actual shift amount of the magnetic head cannot be continuously acquired, so that the accuracy in controlling the magnetic head to be positioned at the center of the track is lowered.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Figure 1:
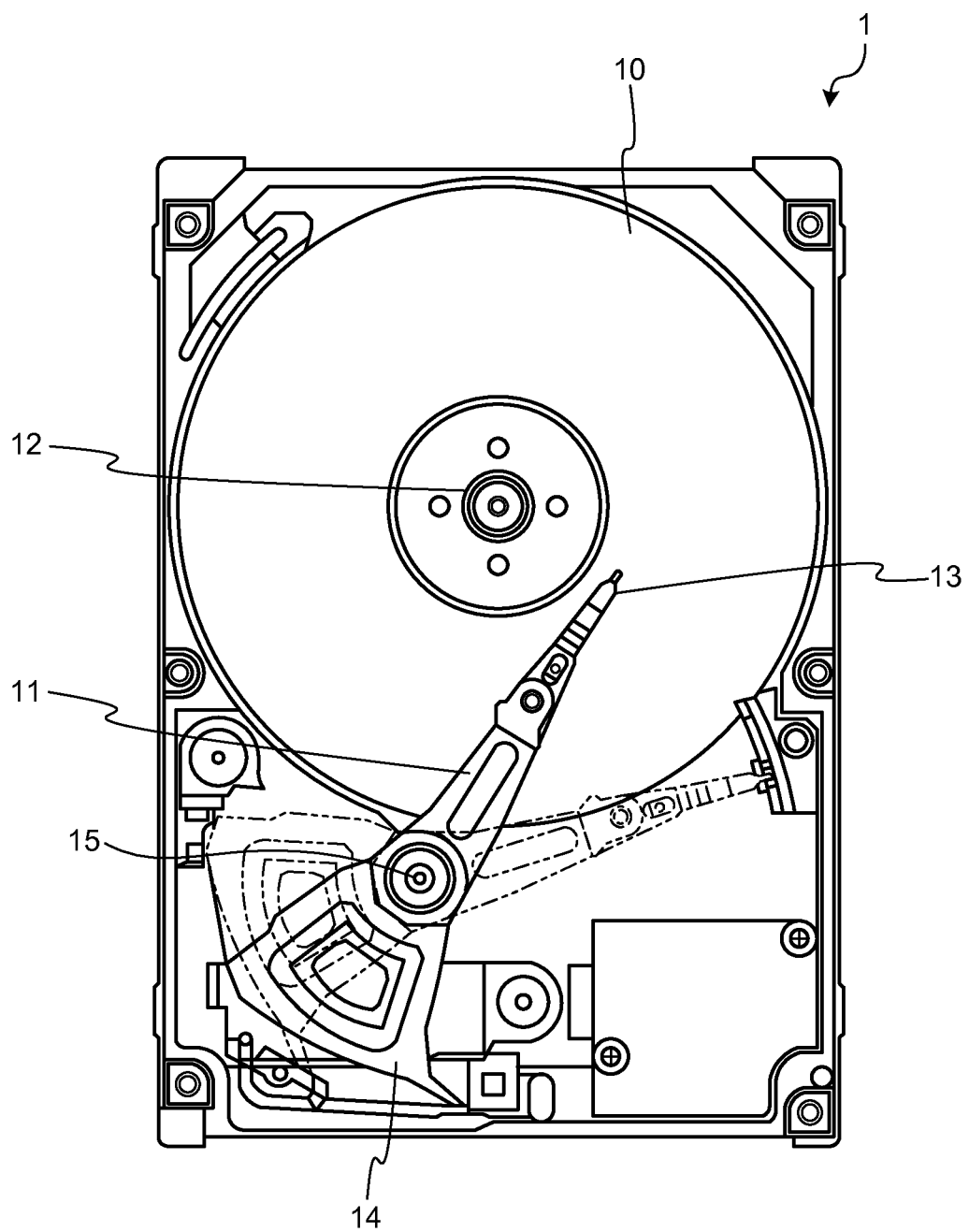
FIG. 1 is an exemplary appearance view of an information storage device according to a first embodiment of the invention.

Various embodiments of a magnetic storage medium, an information storage device, and a control device according to the invention will be described hereinafter with reference to the accompanying drawings. In general, according to one embodiment of the invention, a magnetic storage medium, comprises a magnetic recording layer. The magnetic recording layer comprises: a servo area comprising predetermined servo information; a user data area comprising predetermined user information; two preamble areas comprising a plurality of magnetic bodies made of magnetic particles, the magnetic bodies being arranged in a staggered pattern so that the staggered pattern is inverted with respect to an axis of symmetry at a track center; and a re-sync mark area positioned at a head of the preamble areas and indicates a start of the preamble areas.

According to another embodiment of the invention, an information storage device, comprises: a magnetic storage medium comprising a magnetic recording layer comprising two preamble areas and a re-sync mark area, a plurality of magnetic bodies being formed in the preamble areas with different arrangement, the re-sync mark area being positioned at a head of the preamble areas and indicating a start of the preamble areas; a magnetic head configured to read and write data with respect to the magnetic storage medium; a phase difference detector configured to acquire output of the preamble areas by the magnetic head, and detect phase difference from the readout signal of the preamble areas; a displacement calculator configured to calculate a displacement of the magnetic head with respect to a track center based on the phase difference of the preamble areas detected by the phase difference detector; and a positioning module configured to control a position of the magnetic head to position the magnetic head at the track center based on the displacement of the magnetic head with respect to the track center calculated by the displacement calculator.

According to still another embodiment of the invention, a control device comprises: a phase difference detector configured to receive output acquired by a magnetic head from a magnetic storage medium comprising a magnetic recording layer comprising two preamble areas and a re-sync mark area, a plurality of magnetic bodies being formed in the preamble areas with different arrangement, the re-sync mark area being positioned at a head of the preamble areas and indicating a start of the preamble areas; a displacement calculator configured to calculate a displacement of the magnetic head with respect to a track center based on the phase difference of the preamble areas detected by the phase difference detector; and a positioning module configured to control a position of the magnetic head to position the magnetic head at the track center based on the displacement of the magnetic head with respect to the track center calculated by the displacement calculator.

Hereinafter, a first embodiment of a magnetic storage medium, an information storage device, and a control device will be described in detail based on the accompanying drawings.

First, the outline of an information storage device 1 according to the first embodiment will be described. FIG. 1 is an appearance view of the configuration of the information storage device according to the first embodiment. As illustrated in FIG. 1, the information storage device 1 comprises a magnetic recording medium 10 and an arm 11 that has a front end provided with a magnetic head 13.

The magnetic recording medium 10 is a magnetic storage medium that records a variety of magnetic information with high recording density, and rotates in a predetermined direction by a spindle motor (SPM) 12. The magnetic recording medium 10 is a patterned medium that records variety of information.

As will be described below, the magnetic recording medium 10 has a servo area 20 (refer to FIG. 2) storing servo information, preambles 32 and 33 corresponding to timing synchronization areas 30 (refer to FIG. 2), and a data area 40 (refer to FIG. 2) storing user data. The front end of the arm 11 is provided with the magnetic head 13 that performs a read/write operation on the magnetic recording medium 10.

If a voice coil motor (VCM) 14 that is a head driving mechanism provided on one end of the arm 11 is driven, the arm 11 rotates on a circular arc using a shaft 15 as a rotational center. If the magnetic head 13 moves in a track width direction of the magnetic recording medium 10, a track to be written or read changes.

The magnetic head 13 moves to a target track to be written or read while maintaining a state in which the magnetic head 13 slightly floats on a surface of the magnetic recording medium 10 due to lifting force generated by rotation of the magnetic recording medium 10. Then, the magnetic head 13 executes read process and write process (read/write processes of data).

Figure 2:
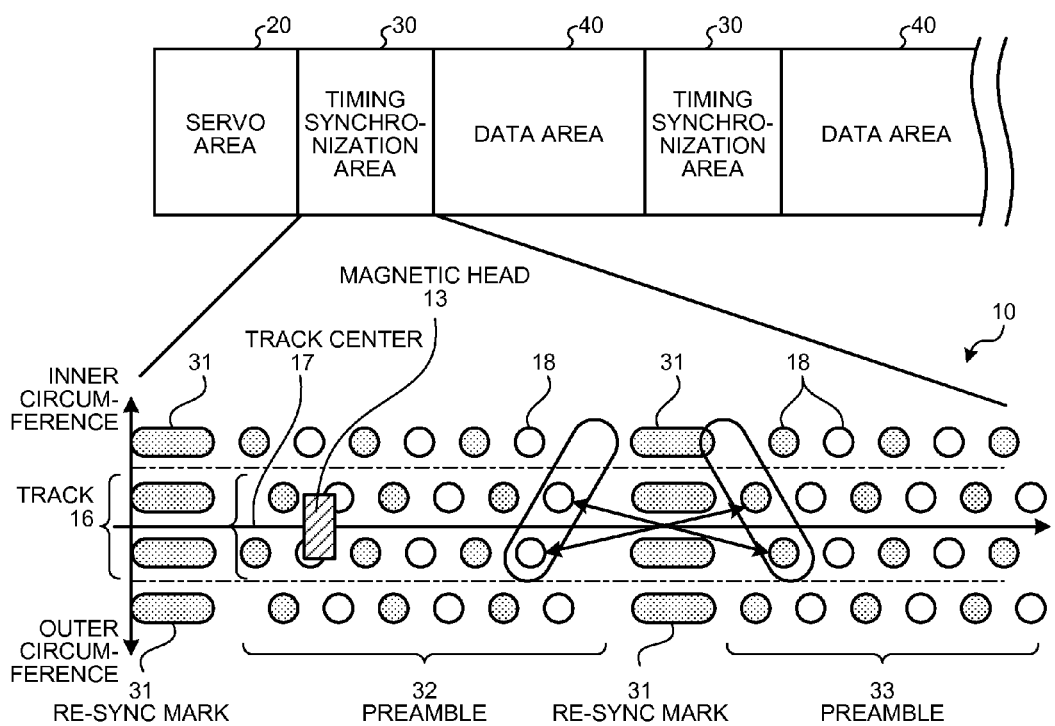
FIG. 2 is an exemplary explanatory diagram of a magnetic recording medium comprised in the information storage device in the first embodiment.

Next, the configuration of the magnetic recording medium 10 that is provided in the information storage device 1 will be described using FIG. 2. FIG. 2 illustrates the configuration of the magnetic recording medium 10 that is comprised in the information storage device 1 according to the first embodiment. In FIG. 2, a horizontal direction indicates a circumferential direction (also called a "track direction") of the magnetic recording medium 10 and a vertical direction indicates a radial direction (inner and outer circumferences) of the magnetic recording medium 10. As illustrated in FIG. 2, the magnetic recording medium 10 according to the first embodiment has a format configuration such that the magnetic recording medium 10 includes the servo area 20, the timing synchronization area 30, and the data area 40.

That is, in the magnetic recording medium 10 according to the first embodiment, the timing synchronization area 30 is provided at a head of the data area 40 subsequent to the servo area 20. Specifically, in one sector of the magnetic recording medium 10, the servo area 20, the timing synchronization area 30, and the data area 40 are repeatedly formed in this order.

The servo area 20 stores servo information corresponding to data used in position control of the magnetic head 13. The servo area 20 has an address portion, a burst portion, and the like. The address portion is a portion from which a reproduction signal indicating a track number and a sector number of the magnetic recording medium 10 is read. The burst portion is a portion for reading out a reproduction signal controlling the magnetic head 13 to be positioned at a track center 17 of a track 16.

The timing synchronization area 30 includes a plurality of magnetic dots 18 that are disposed with a predetermined pattern, such that a reproduction signal having a constant frequency is read. In the first embodiment, as illustrated in FIG. 2, the timing synchronization area 30 has a re-sync mark 31 and two preambles 32 and 33.

That is, the timing synchronization area 30 has the re-sync mark 31, the preamble 32, the re-sync mark 31, and the preamble 33, in this order. The first re-sync mark 31 and the preamble 32 are positioned at the head of the timing synchronization area 30. The timing synchronization area 30 sequentially has the re-sync mark 31 and the preamble 32, even after the preamble 33.

In the preambles 32 and 33, the magnetic dots 18 are arranged in a staggered pattern, and the arrangement is inverted with respect to an axis of symmetry at the track center 17. Specifically, as illustrated in FIG. 2, the magnetic dots 18 are disposed to be tilted rightwards in the preamble 32, and the magnetic dots 18 are disposed to be tilted leftwards in the preamble 33.

Magnetic poles of the magnetic dots 18 of the preambles 32 and 33 form a positive and negative magnetic dot pattern. The two arrangements of the magnetic dots 18 are collected to constitute one track 16.

In FIG. 2, the magnetic dots 18 (magnetic bodies) that are illustrated by black dot marks are positively magnetized, and the magnetic dots 18 that are illustrated by white dot marks are negatively magnetized. That is, in the two preambles 32 and 33, the positively magnetized magnetic dots 18 and the negatively magnetized magnetic dots 18 are alternately disposed in the staggered pattern.

The re-sync mark 31 is disposed such that the reproduction signal indicating a start of the preambles 32 and 33 is read. The re-sync mark 31 has a pattern length that corresponds to a data bit length, and is continuously disposed in a radial direction of the track 16.

That is, the re-sync mark 31 is provided as a reference signal for detecting phase differences between the two preambles 32 and 33, and accordingly, the phase differences between the two preambles 32 and 33 can be accurately detected based on the re-sync signal of the re-sync mark 31. In other words, in the first embodiment, a phase difference between signals (phase difference between the preambles 32 and 33) each having a constant frequency are detected, so that a track offset signal can be acquired. Accordingly, the movement control of the magnetic head 13 is performed based on the acquired phase difference.

The timing synchronization area 30 that constitutes the magnetic recording medium 10 according to the first embodiment has the two preambles 32 and 33. Further, the positive and negative magnetic dots 18 are arranged in the staggered pattern so that the pattern is inverted with respect to the axis of symmetry at the track center 17. Accordingly, when the magnetic head 13 passes over a passage that is radially shifted, reproduction signals with phase difference is generated. Therefore, the displacement can be detected based on the phase difference of when the magnetic head 13 is off-tracked in the track crossing direction.

Specifically, the phase difference of the two preambles 32 and 33 that are separated by the re-sync mark 31 are compared with each other. By the comparison, the displacement of the magnetic head 13 in the track crossing direction at the time of off-tracking can be detected based on reproduction signals by the positive magnetic dot 18 and the negative magnetic dot 18.

That is, when the magnetic head 13 is off-tracked in the radial direction, the phase difference is generated between the reproduction signals detected from the two preambles 32 and 33. Hence, by calculating a positioning signal based on the phase difference, high-precision positioning control can be performed.

Figure 3:
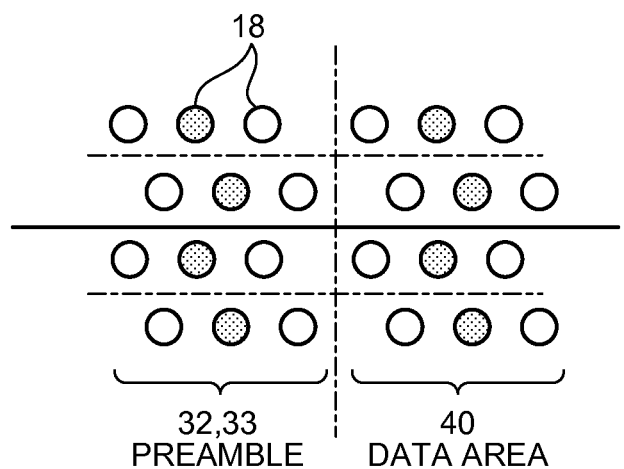
FIG. 3 is an exemplary explanatory diagram of a data area in the first embodiment.
Figure 4:
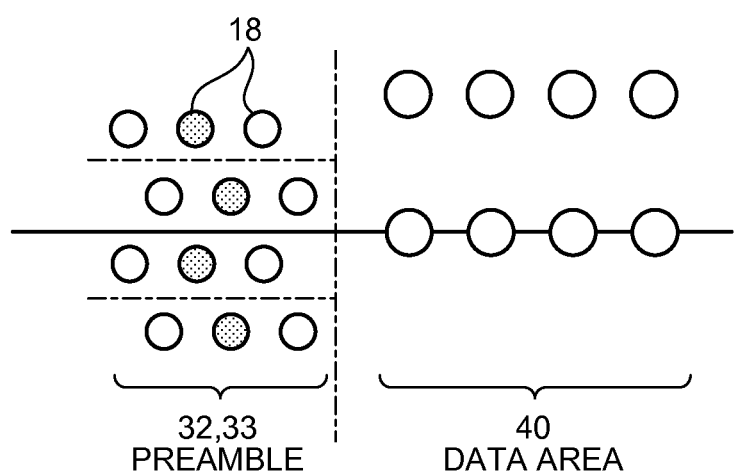
FIG. 4 is another exemplary explanatory diagram of the data area in the first embodiment.

Next, the configuration of the data area 40 will be described using FIGS. 3 and 4. FIGS. 3 and 4 each illustrate an example of the magnetic dot arrangement of the data area 40. As illustrated in FIG. 3, the magnetic dots 18 that are provided in the data area 40 of the magnetic recording medium 10 can be arranged in the zigzag shape.

Further, as illustrated in FIG. 4, the magnetic dots 18 that are provided in the data area 40 of the magnetic recording medium 10 can be arranged in a square lattice shape. As illustrated in FIG. 4, the magnetic dots 18 that are formed in the square lattice shape are positioned on the track center 17 of the track 16.

Next, the phase difference between the reproduction signals each output from the two preambles 32 and 33 formed in the timing synchronization area 30 according to the first embodiment will be described using FIGS. 5 and 6A to 6C.

Figure 5:
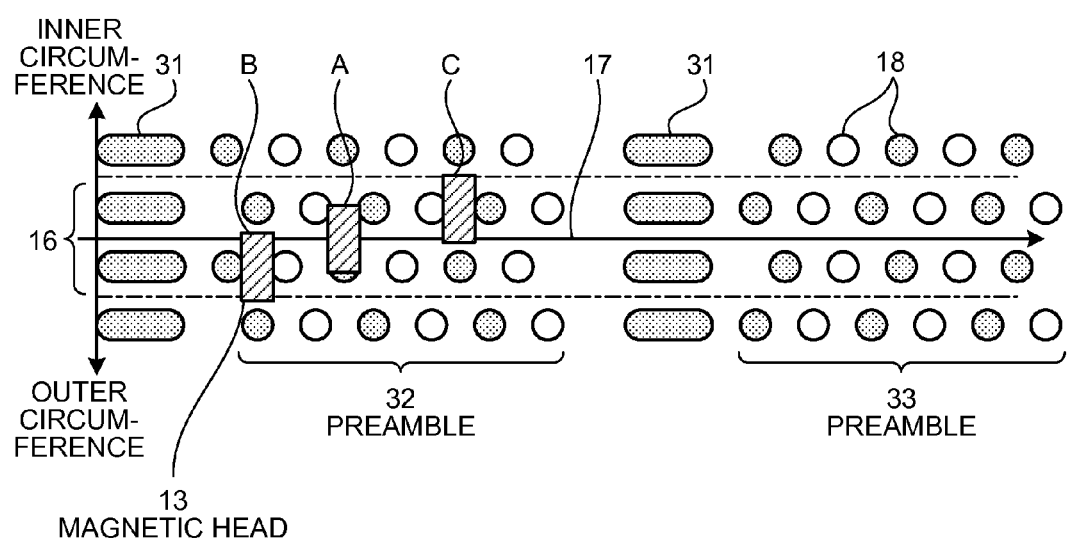
FIG. 5 is an exemplary explanatory diagram for explaining off-track of a magnetic head in the first embodiment.
Figure 6A:
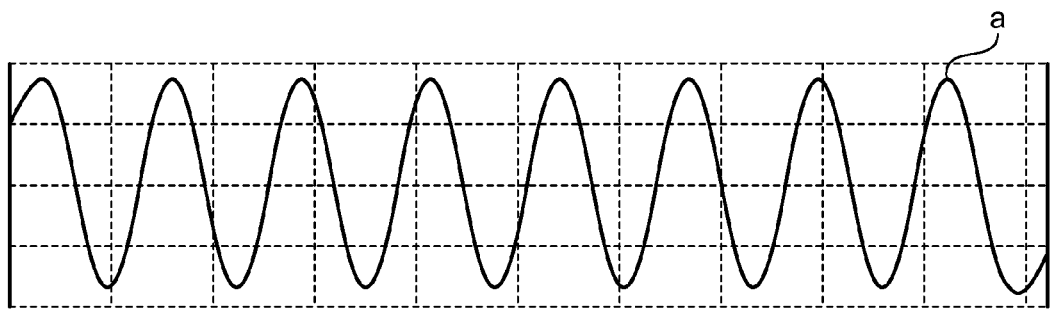
FIG. 6A is an exemplary waveform diagram of a reproduction signal based on a preamble at a track crossing position in the first embodiment.
Figure 6B:
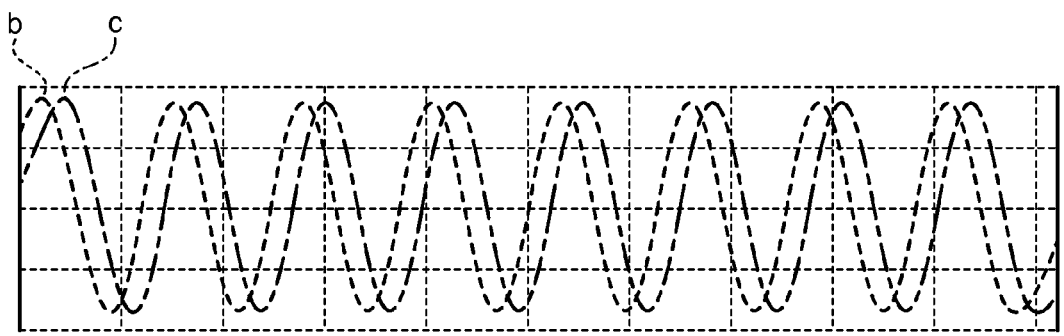
FIG. 6B is another exemplary waveform diagram of a reproduction signal based on a preamble at a track crossing position in the first embodiment.
Figure 6C:
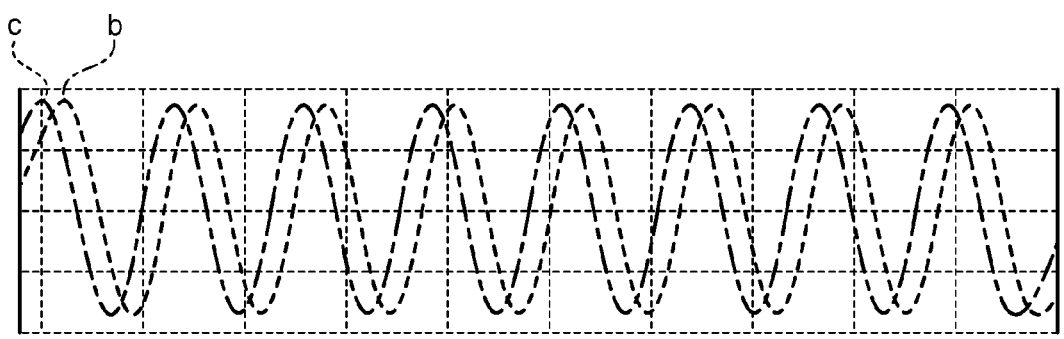
FIG. 6C is another exemplary waveform diagram of a reproduction signal by a preamble at a track crossing position in the first embodiment.

FIG. 5 is a diagram for explaining a waveform of a reproduction signal produced by the magnetic head 13 that passes over the track 16 of the magnetic recording medium 10. FIGS. 6A to 6C illustrate exemplary waveforms of reproduction signals of preambles at a track crossing position. Specifically, FIGS. 6A to 6C illustrate waveforms where the strengths of the reproduction signals detected by the magnetic head 13 are estimated (simulated), when the width of the magnetic head 13 is set to a ½ track.

As described above, in the magnetic recording medium 10 according to the first embodiment, in the preambles 32 and 33, the positively and negatively magnetized magnetic dots 18 are alternately disposed in the staggered pattern, and the arrangement is inverted with respect to the axis of symmetry at the track center 17. For this reason, depending on the passage of the magnetic head 13 with respect to the track 16, the waveforms of the reproduction signals of the preambles 32, 33 become different.

As illustrated in FIG. 5, when the magnetic head 13 is positioned at a portion A of FIG. 5 (on-track state), the magnetic head 13 faces the track center 17 of the track 16. Therefore, the waveform of the reproduction signal of the preamble 32 of the timing synchronization area 30 substantially matches with the waveform of the reproduction signal of the preamble 33. Thereby, as illustrated in FIG. 6A, there is no phase difference in the waveforms of the reproduction signals of the preambles 32 and 33.

When the magnetic head 13 is positioned at the portion B of FIG. 5, the position of the magnetic head 13 is offset by ¼ of a track pitch (¼ Tp) towards the outer circumferential side of the track 16. Therefore, as illustrated in FIG. 6B, a phase of a waveform b of the reproduction signal of the preamble 32 is advanced. A phase of a waveform c of the reproduction signal of the preamble 33 is delayed.

Meanwhile, when the magnetic head 13 is positioned at the portion C of FIG. 5, the position of the magnetic head 13 is offset by ¼ Tp towards the inner circumferential side of the track 16. Therefore, as illustrated in FIG. 6C, the phase of the waveform b of the reproduction signal of the preamble 32 of the timing synchronization area 30 is delayed. The phase of the waveform c of the reproduction signal of the preamble 33 is advanced.

That is, in the first embodiment, the magnetic dots 18 are disposed in the staggered shape, and the arrangement is inverted with respect to the axis of symmetry at the track center 17, in the preambles 32 and 33. Therefore, depending on the position where the magnetic head 13 passes over the track 16, the waveforms reproduced from the preambles 32, 33 correspond to different reproduction signal (or in other words, the waveforms have phase difference).

As illustrated above, in the first embodiment, the positive and negative magnetic dots 18 are arranged in the staggered shape, and the arrangement is inverted with respect to the axis of symmetry at the track center 17, in the preambles 32 and 33. Therefore, depending on the position where the magnetic head 13 passes over the track 16, there is a phase difference between the waveforms of the reproduction signals of the preambles 32 and 33. Hence, the positioning signal used as the displacement of the magnetic head 13 can be acquired by comparing and calculating the phase difference.

Specifically, the phase difference acquired from the two preambles 32 and 33 are compared and calculated, and the positioning control of the magnetic head 13 is performed using a displacement function (positioning-phase-difference signal) based on the phase difference obtained by the calculation. In this case, the positioning-phase-difference signal can be represented as a value from the phase difference vs. displacement function illustrated in FIG. 7.

Figure 7:
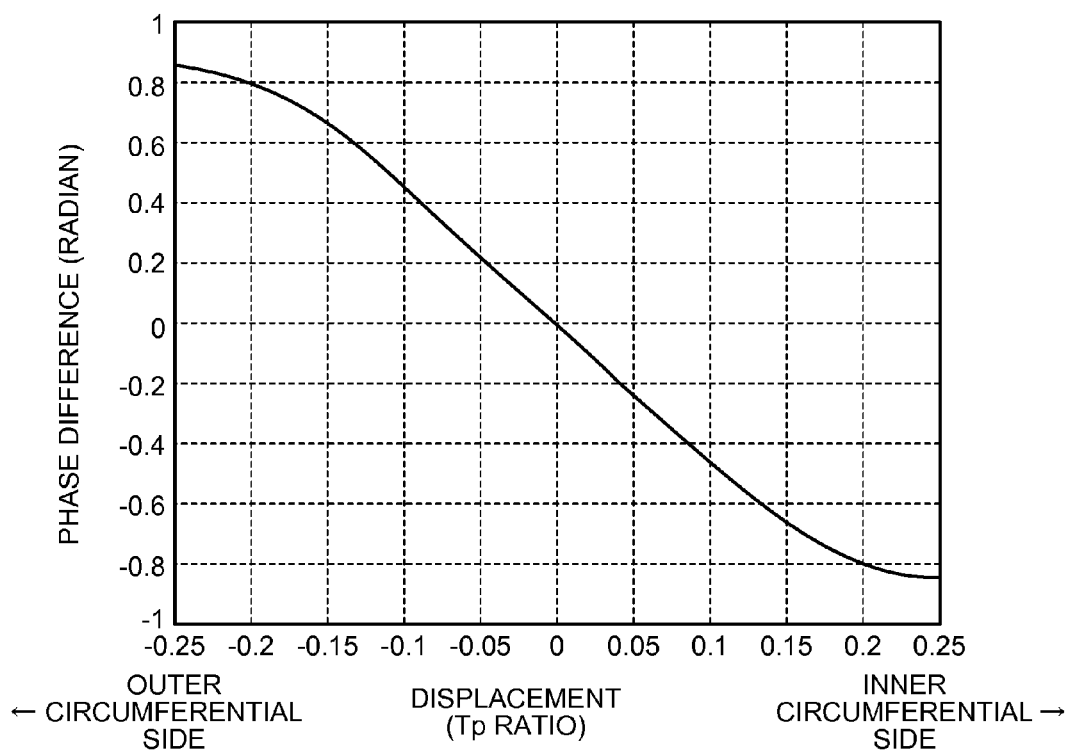
FIG. 7 is an exemplary graph for explaining a positioning phase difference signal from the preamble in the first embodiment.

Next, the positioning-phase-difference signal obtained from the preambles will be described. FIG. 7 illustrates the positioning-phase-difference signal obtained from the preamble. In FIG. 7, a vertical axis indicates a phase difference (in radian) between the preambles 32 and 33, and a horizontal axis indicates the displacement (in Tp ratio) of the magnetic head. In FIG. 7, a position of "0" at the horizontal axis corresponds to a position where there is no phase difference, and indicates that the magnetic head 13 is in the on-track state.

The graph of the phase difference vs. the magnetic head displacement illustrated in FIG. 7 can be acquired by reading the servo information of the magnetic recording medium 10 by the magnetic head 13 at the time of formatting the magnetic recording medium 10. The displacement of the magnetic head 13 that corresponds to the phase difference can be acquired by using the value obtained from the phase difference vs. displacement function illustrated in FIG. 7. Accordingly, the positioning control can be performed.

The phase difference vs. displacement function illustrates a graph of a phase difference between the reproduction signals from the preambles 32 and 33 during the off-track of the magnetic head 13, with respect to the accurate displacement of the magnetic head 13. The magnetic head displacement and the phase difference acquired from the magnetic head displacement is stored as a phase difference/displacement table 61 (refer to FIG. 8) that is provided in a memory 60.

Specifically, the movement of the magnetic head 13 is controlled such that the phase difference of the preamble 31 and the preamble 32 becomes "0". Therefore, when the phase difference of the preamble 31 and the preamble 32 is "0.2", the magnetic head 13 is controlled to move towards the inner circumferential side of the track 16 by "0.05". Further, when the phase difference of the preamble 31 and the preamble 32 is "−0.8", the magnetic head 13 is controlled to move towards the outer circumferential side of the track 16 by "−0.2".

Figure 8:
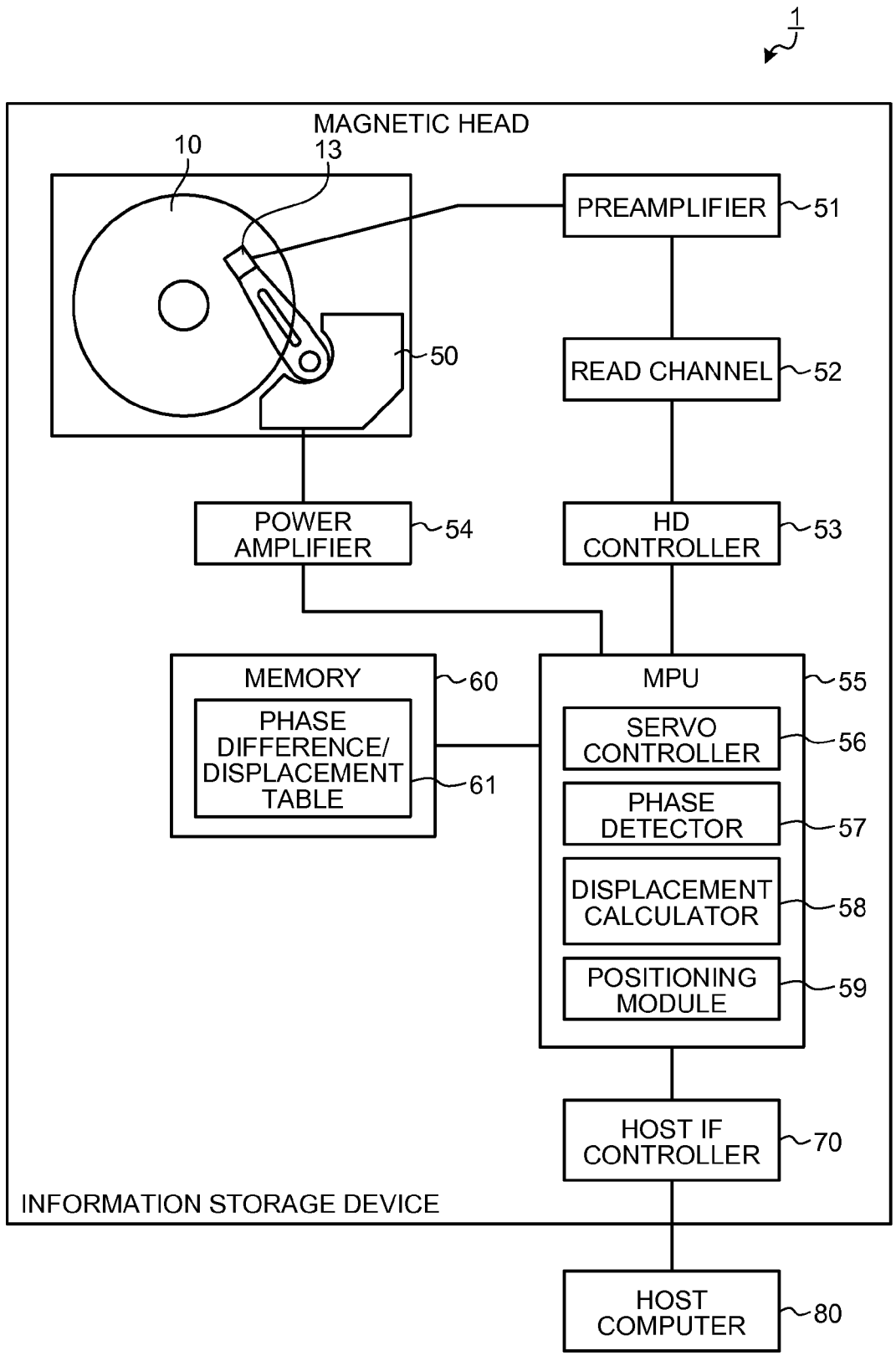
FIG. 8 is an exemplary block diagram of an information storage device in the first embodiment.

Next, the functional configuration of information storage device 1 will be described. FIG. 8 illustrates the functional configuration of the information storage device 1.

As illustrated in FIG. 8, the information storage device 1 comprises a magnetic recording medium 10, a magnetic head 13, a VCM 50, a preamplifier 51, a read channel 52, a hard disk (HD) controller 53, a power amplifier 54, and a micro processing unit (MPU) 55.

The MPU 55 may be a micro controller unit (MCU) or a central processing unit (CPU). The MPU 55 is connected to a host computer 80 through a host interface (IF) controller 70. The VCM 50 performs positioning of the magnetic head 13. The preamplifier 51 amplifies a weak reproduction signal that is read by the magnetic head 13 and outputs the reproduction signal to the read channel 52.

The preamplifier 51 amplifies the reproduction signal output from the magnetic head 13, and transmits the reproduction signal to the read channel 52. The read channel 52 extracts a servo signal and a record reproduction signal from the reproduction signal, through various filters.

The read channel 52 controls the record reproduction signal. The read channel 52 amplifies the reproduction signal received from the preamplifier 51 to maintain the amplitude of the reproduction signal to be constant, or performs an analog to digital (AD) conversion or demodulation on the reproduction signal.

The reproduction signal comprises a record reproduction signal read from the data area 40 and a servo signal read from the servo area 20 (refer to FIG. 2). The read channel 52 modulates a code of data when the data (user data) is received from the HD controller 53, and outputs the data to the preamplifier 51.

The servo signal that is demodulated in the read channel 52 becomes a positioning signal by the HD controller 53, and is transmitted to the power amplifier 54 as a VCM control signal for controlling the VCM 50 from the MPU 55.

A write clock that becomes basis of a write signal is supplied by an external crystal oscillator, and a frequency of the write clock is converted into a frequency suitable for a recording density in each track 16 through a phase-locked loop (PLL) circuit (not illustrated) in the read channel 52.

The HD controller 53 receives a command from the host computer 80 through the host IF controller 70, and controls the operation of the information storage device 1 or checks an error of data transmitted between the host computer 80 and the information storage device 1. The HD controller 53 receives the reproduction signal from the read channel 52, corrects an error when necessary, and outputs the reproduction signal to the MPU 55 or the host computer 80.

The power amplifier 54 generates a VCM driving current to drive the VCM 50, based on the VCM control signal received from the MPU 55, and outputs the generated VCM driving current to the VCM 50. Specifically, the power amplifier 54 drives the VCM 50 according to the servo signal output from the HDC, and drives the magnetic head 13.

The MPU 55 is a controller that performs main control of the information storage device 1 or positioning control of the magnetic head 13 by a predetermined control program (firmware program). The MPU 55 has a servo controller 56, a phase difference detector 57, a displacement calculator 58, and a positioning module 59.

The phase difference detector 57 detects a phase difference between the reproduction signals of the two preambles 32 and 33, based on outputs from the two preambles 32 and 33 acquired by the magnetic head 13.

The displacement calculator 58 calculates the displacement of the magnetic head 13 with respect to the track center 17, based on the phase difference between the reproduction signals of the two preambles 32 and 33 detected by the phase difference detector 57.

The positioning module 59 controls the magnetic head 13 to position the magnetic head 13 at the track center 17, based on the displacement of the magnetic head 13 with respect to the track center 17 calculated by the displacement calculator 58.

The servo controller 56 is a processor that controls a target position to which the magnetic head 13 is moved, based on the displacement of the magnetic head 13 calculated by the positioning module 59.

Upon receipt of the VCM control signal, the power amplifier 54 outputs a VCM driving current to the VCM 50, and drives the VCM 50. The position of the magnetic head 13 that is driven by the VCM 50 is accurate because the position is determined based on the displacement of the magnetic head 13 calculated by the positioning module 59.

Figure 9:
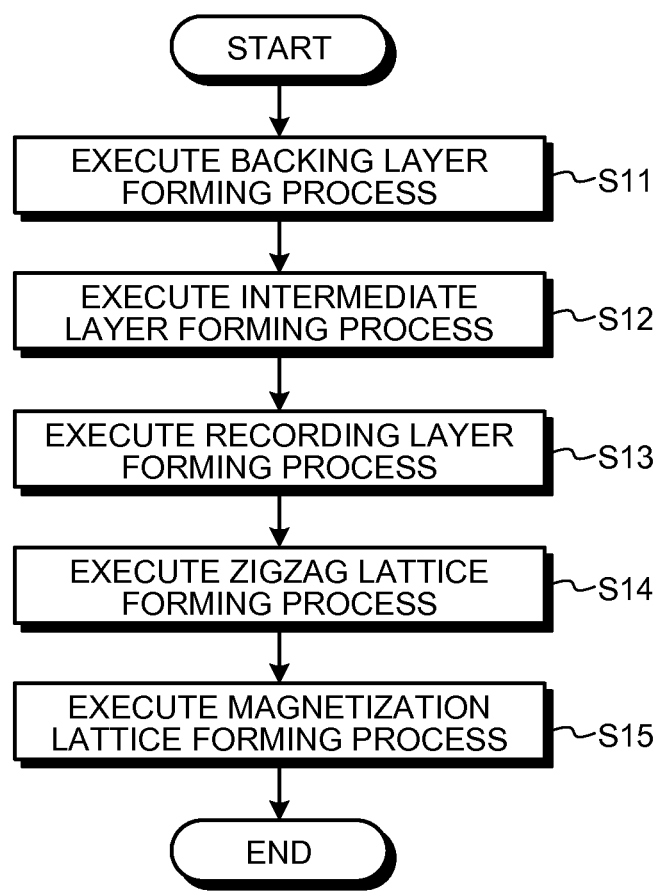
FIG. 9 is an exemplary flowchart of manufacturing process of a magnetic recording medium in the first embodiment.

Next, a method of manufacturing the magnetic recording medium 10 according to the first embodiment will be described with reference to FIG. 9. FIG. 9 is a flowchart of manufacturing process of the magnetic recording medium 10 according to the first embodiment. In the description below, it is assumed that the method of manufacturing the magnetic recording medium 10 according to the first embodiment is executed by a manufacturing system that manufactures the magnetic recording medium 10 according to a predetermined sequence.

As illustrated in the flowchart of FIG. 9, in the manufacturing system of the magnetic recording medium 10, backing layer forming process, intermediate layer forming process, recording layer forming process, staggered lattice forming process, and magnetizing process are sequentially executed.

That is, first, in the manufacturing system of the magnetic recording medium, the backing layer forming process is executed to form a backing layer on a top surface of a prepared substrate (S11). The substrate on which the backing layer is laminated has an approximately disc shape in external view, and is formed using a non-magnetic material, such as glass and aluminum alloy. Preferably, the substrate has high flatness and high mechanical strength.

The backing layer is formed using a soft magnetic material such as Cobalt Zirconium Niobium (CoZrNb). The backing layer forms a magnetic path that causes a magnetic flux generated from the magnetic head 13 (refer to FIG. 1) to reflux into the magnetic head 13 through a recording layer.

Next, the intermediate layer forming process is executed to form an intermediate layer on a top surface of the backing layer (S12). The intermediate layer is formed as a control layer that controls a crystal orientation or a crystal grain size of the recording layer formed on the top surface of the intermediate layer. As a material of the intermediate layer, for example, ruthenium (Ru) is used.

Next, the recording layer forming process is executed to form the recording layer on the top surface of the intermediate layer laminated on the backing layer (S13). Specifically, the recording layer with the tracks 16 (refer to FIG. 2) for recording data is formed on the top surface of the intermediate layer.

Next, a magnetic dot pattern is formed on the top surface of the recording layer so that a staggered lattice is formed on the surface of the recording layer (magnetic recording medium 10) (S14). Specifically, the magnetic dots are alternately disposed in a staggered shape, and a plurality of magnetic bodies are formed such that the arrangement thereof is inverted with respect to the axis of symmetry at the track center 17 (refer to FIG. 2).

The magnetic bodies that are provided in the magnetic recording medium 10 (recording layer) are formed by patterning process using etching. In this case, each bit width of the staggered lattice formed on the recording layer is several nanometers in a circumferential direction (track direction) and a radial direction of the magnetic recording medium 10, and the height is several nanometers.

In order to stabilize a flying characteristic of the magnetic head 13 (refer to FIG. 1), a non-magnetic material is filled between the bits (gaps) of the recording layer. The surface of the recording layer is smoothened by chemical mechanical polishing (CMP). In this case, the non-magnetic material has magnetic permeability that is different from that of the material of the recording layer. For example, a material, such as silicon dioxide ($SiO_2$), is used.

Finally, the magnetizing process is executed to apply a predetermined magnetic field (for example, positive polarity) to the material bodies formed on the top surface of the recording layer (S15). Specifically, all of the magnetic bodies that form the magnetic recording medium 10 are magnetized with the same polarity (for example, positive polarity). By this sequence, the magnetic recording medium 10 is manufactured. Then, the magnetic recording medium 10 is mounted in the information storage device 1.

Figure 10:
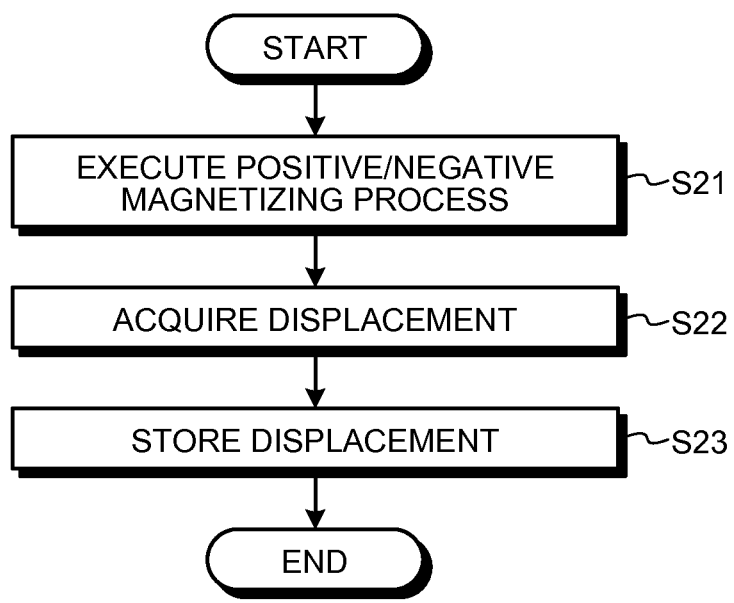
FIG. 10 is an exemplary flowchart of format process of the magnetic recording medium in the first embodiment.

Next, format process of the magnetic recording medium 10 according to the first embodiment is described using FIG. 10. FIG. 10 is a flowchart illustrating the format process of the magnetic recording medium 10 according to the first embodiment. In the description below, the method of formatting the magnetic recording medium 10 is described as a sequence in which the information storage device 1 formats the magnetic recording medium 10 in a predetermined sequence.

First, as illustrated in the flowchart of FIG. 10, positive/negative magnetizing process is executed to change the polarities of the magnetic dots of the magnetic recording medium 10 to one of positive and negative (S21). Specifically, the information storage device 1 forms the servo area 20, the re-sync mark 31, and the preambles 32 and 33 on the track 16 of the magnetic recording medium 10, and the positive/negative magnetizing process is executed with respect to the magnetic dots 18 provided in the preambles 32 and 33. That is, the magnetic field is applied to the magnetic dots 18 such that the magnetic dots 18 constituting the preambles 32 and 33 are alternately magnetized between the positive and negative polarities.

Next, displacement acquiring process is executed based on the phase difference of the preambles 32 and 33 (S22). Specifically, when the servo information of the preambles 32 and 33 is read by the magnetic head 13, the displacement of the magnetic head 13 corresponding to the phase difference of the preambles 32 and 33 is calculated and acquired as a function value.

Next, the displacement of the magnetic head 13 corresponding to the phase difference of the preambles 32 and 33 acquired by the process of S22 is calculated as the function value (refer to FIG. 7), and the calculation result is stored in the phase difference/displacement table 61 (refer to FIG. 8) (S23).

In particular, the phase difference/displacement table 61 is created based on the displacement of the magnetic head 13 as a function value with respect to the phase difference of the preambles 32 and 33, and positioning control of the magnetic head 13 is performed using the phase difference/displacement table 61.

Figure 11:
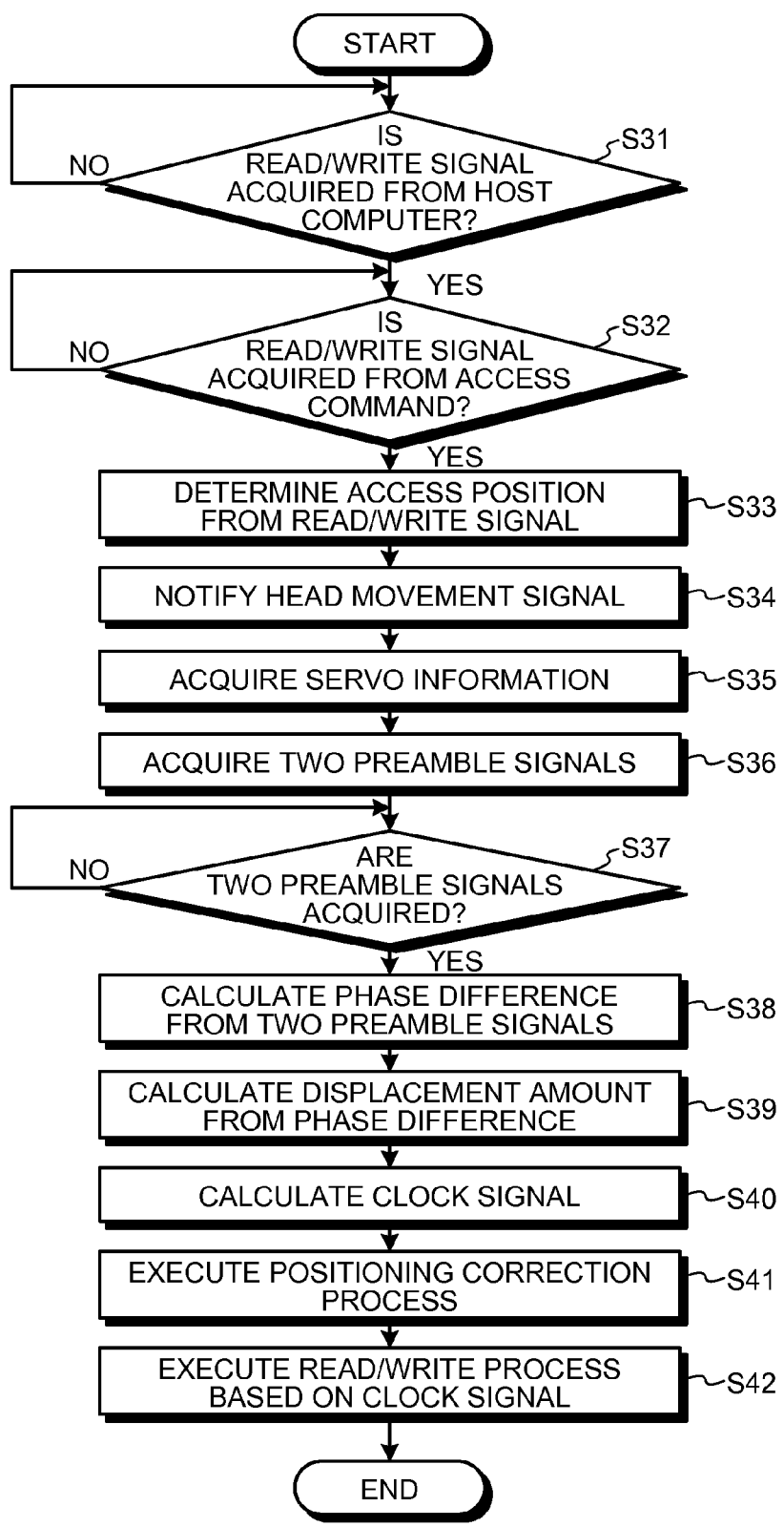
FIG. 11 is an exemplary flowchart of read/write process of the magnetic recording medium in the first embodiment.

Next, process at the time of reading and writing data according to the first embodiment will be described using FIG. 11. FIG. 11 is a flowchart illustrating a process sequence at the time of reading/writing data by the information storage device 1 according to the first embodiment. In the following, the process sequence at the time of reading/writing data in the first embodiment is executed by the MPU 55 (refer to FIG. 8) of the information storage device 1.

As illustrated in the flowchart of FIG. 11, first, it is determined whether a read/write signal (access command) is acquired from the host computer 80 (refer to FIG. 8) (S31). Specifically, it is determined whether the access command is transmitted from the host computer 80. When it is determined that the read/write signal is acquired (Yes at S31), it is determined whether the read/write signal (access signal) is acquired from the access command (S32).

As the determination result of S32, when the access signal is acquired (Yes at S32), an access position of the magnetic recording medium 10 is determined (S33). Specifically, based on the access signal transmitted from the host computer 80, positions of a track and a sector of the magnetic recording medium 10 where the data is to be read from or to be written to by the magnetic head 13 are determined.

Next, a movement signal of the magnetic head 13 is notified based on the access command (S34). Then, the servo information is acquired from the servo area 20 of the magnetic recording medium 10 by the magnetic head 13 (S35), and the preamble signals are acquired from the two preambles 32 and 33 in the timing synchronization area 30 (S36). As described above, the waveforms of the preamble signals acquired from the two preambles 32 and 33 have a phase difference (refer to FIGS. 6B and 6C).

Next, it is determined whether the two preamble signals are acquired (S37). When it is determined that the two preamble signals are acquired (Yes at S37), the phase difference is calculated for the two preamble signals (S38).

Next, the displacement (shift amount) is calculated from the phase difference of the two preambles 32 and 33 acquired in S38 (S39). In particular, based on the phase difference/displacement table 61 of FIG. 8, the displacement amount of the magnetic head 13 is acquired. Here, the displacement corresponds to the phase difference between the reproduction signals of the two preambles 32 and 33.

Next, a clock signal is calculated (S40). Specifically, middle points between the waveforms of the signals of the two preambles 32 and 33 are extracted, and the clock signal is corrected. The detailed description of the clock signal correction will be provided below using FIG. 12.

Next, positing correction process is executed (S41). Specifically, the positioning correction of the magnetic head 13 is performed based on the displacement of the magnetic head 13 acquired by the phase difference/displacement table 61 (refer to FIG. 8).

Finally, the read/write process is executed with respect to the magnetic recording medium 10, based on the clock signal calculated in S40 (S42). By this sequence, the read/write process is executed with respect to the magnetic recording medium 10. In this case, since the positioning of the magnetic head 13 can be accurately performed, the data can be accurately and quickly read and written.

Figure 12:
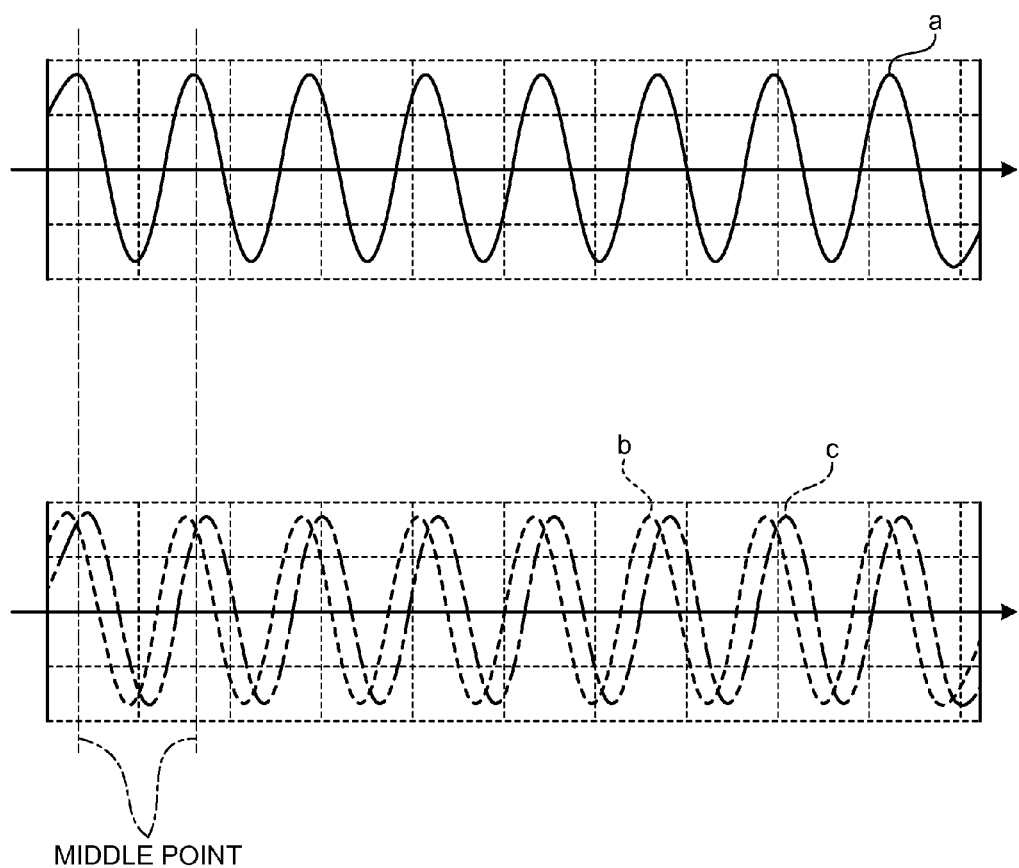
FIG. 12 is an exemplary waveform diagram for explaining correction of a clock signal in the first embodiment.

Next, an operation correcting method of a clock signal will be described using FIG. 12. FIG. 12 illustrates the operation correcting method of the clock signal. The waveform on the top of FIG. 12 indicates a waveform "a" of when the magnetic head 13 is on-track, and the waveform on the bottom of FIG. 12 indicates a waveform "b" of the preamble 32 and a waveform "c" of the preamble 33 of when the magnetic head 13 is off-track.

As illustrated in FIG. 12, when the magnetic head 13 is on-track, there is no phase difference between the waveforms of the reproduction signals of the preambles 32 and 33. Meanwhile, when the magnetic head 13 is off-track, there is a phase difference between the waveforms "b" and "c" of the reproduction signals of the preambles 32 and 33 because the reproduction signals are different from each other.

That is, in view of the magnetic dot pattern that has the positive/negative staggered lattice arrangement illustrated in the first embodiment, when the magnetic head 13 is shifted in a radial direction with respect to the track center 17, the phases of the reproduction signals are shifted. Accordingly, the error factor such as the phase difference or the decrease in amplitude is generated in the clock signal corresponding to the read/write timing.

Specifically, the magnetic head 13 sets the read/write timing of data according to the clock signal. However, when the magnetic head 13 is off-tracked due to, for example, vibration or disturbance of the information storage device 1, the phase difference is generated between the reproduction signals of the two preambles 32 and 33. For this reason, the clock signal is generated based on the phase difference.

Further, for example, when the clock signal based on one of the reproduction signals of the preambles 32 and 33 is used, the read/write process may be executed by the magnetic head 13 at wrong timing.

For this reason, in the first embodiment, a calculation is performed on the phase difference that are acquired from the two preambles 32 and 33 (averaging process), and a new clock signal is generated. Accordingly, the clock signal is corrected so that the timing becomes the same as that of the reproduction signal at the time of the on-track. That is to say, as illustrated in FIG. 12, the clock correcting process is executed so as to extract the middle points between the wave forms of the signals of the two preambles 32 and 33.

As described above, in the first embodiment, the clock signal is corrected based on the middle point of the phase difference detected between the reproduction signals of the two preambles 32 and 33. Therefore, even when the magnetic head 13 is off-tracked, an accurate clock signal that coincides with the magnetic dot arrangement can be acquired. As a result, the recording reproduction precision by the magnetic head 13 of the information storage device 1 can be improved.

Further, in the first embodiment, the clock signal having the optimal phase and frequency can be calculated. Accordingly, the magnetic head 13 can be accurately placed at the positions over the magnetic dots to be written or read, and the read/write process by the magnetic head 13 can be quickly executed.

Figure 13:
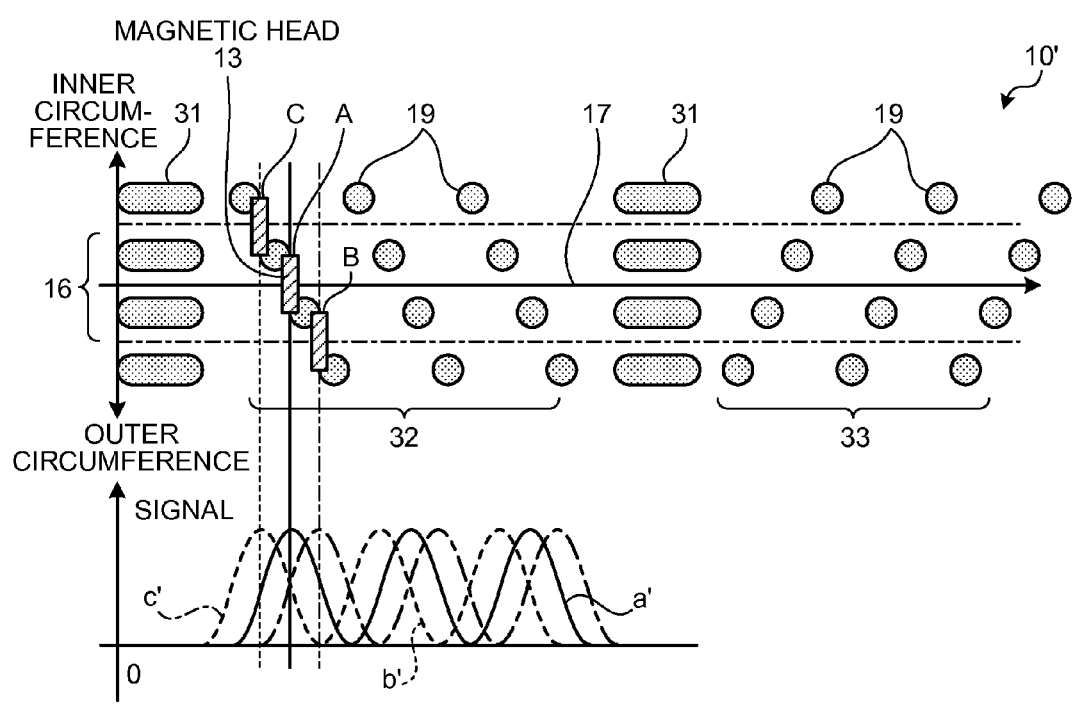
FIG. 13 is an exemplary explanatory diagram for explaining a configuration of a magnetic recording medium according to a second embodiment of the invention.

Next, the configuration of magnetic dot arrangement of a magnetic recording medium 10' according to a second embodiment will be described. FIG. 13 illustrates magnetic dots that are formed on the magnetic recording medium 10' according to the second embodiment.

In the first embodiment, the preambles 32 and 33 formed in the timing synchronization area 30 of the magnetic recording medium 10 have the magnetic dot pattern configured by the positive and negative magnetic poles in a staggered shape. However, in the second embodiment, as illustrated in FIG. 13, the two preambles 32 and 33 have a magnetic dot pattern configured by only one of positive and negative magnetic poles, and not by both of the positive and negative magnetic dot patterns.

As illustrated in FIG. 13, the preambles 32 and 33 formed in the timing synchronization area 30 according to the second embodiment are formed in the staggered shape, and a plurality of magnetic dots 19 having only a positive polarity are formed such that the arrangement is inverted with respect to the axis of symmetry at the track center 17.

In the first embodiment, the magnetic dots 18 are tilted for each track 16, and arranged. However, in the second embodiment, as illustrated in FIG. 13, the dot patterns are continuously tilted over several tracks, and arranged.

Similar to the servo area (refer to FIG. 2), the magnetic dots 19 with only one of the polarities according to the second embodiment can be formed by applying a magnetic field from outside and magnetizing the magnetic dot 19 where the DC magnetization is not performed.

As illustrated in FIG. 13, since waveforms a', b', and c' that are detected from the preambles 32 and 33 of when the magnetic head 13 passes over the track corresponds to the magnetic pattern with the same polarity (positive), the detected waveform belongs to the positive side. In this case, the reproduction signals from the preambles 32 and 33 become signals with zero level, because the magnetic dot is not disposed in the portion having the negative polarity.

As illustrated in FIG. 13, positions (portions A, B, and C) of the magnetic head 13 on the track 16 correspond to positions at the maximum peaks of the three waveforms a', b', and c'.

The waveform a' is a reference waveform (waveform with no phase difference) because the magnetic head 13 is positioned at the track center 17. The waveform b' of the preamble 32 and the waveform c' of the preamble 33 are waveforms that have the phase difference. The phases of the waveforms b' and c' are delayed toward the inner circumferential side and the outer circumferential side.

Similar to the first embodiment, even in the second embodiment, the phase difference between the two preambles 32 and 33 are compared and calculated. Accordingly, the displacement of the magnetic head 13 is calculated accurately from the phase difference/displacement function value (phase difference/displacement table 61) illustrated in FIG. 7, and the positioning control is performed based on the calculated displacement.

According to the second embodiment, since the signal amplitude from the two preambles 32 and 33 is reduced to a half, gain of the reproduction signal level is adjusted and increased about twice as much, or adjusted by the re-sync mark 31 that is written in the head in the pattern of the positive magnetic poles, subsequent to the two preambles 32 and 33.

In the case of the magnetic recording medium 10' according to the second embodiment, interference from the adjacent tracks 16 can be reduced by increasing the gaps between the magnetic dots 19. Therefore, the reproduction signal can be acquired accurately without the positional shift. Further, since it is unnecessary to perform one of the positive and negative magnetization, the magnetic pole forming process becomes easy, and the timing acquisition operation by the clock signal can be simplified.

Different from the first embodiment, in the second embodiment, since the dot patterns are continuously tilted over the several tracks and arranged, the phase changes by $\pi$ when the magnetic head 13 is shifted by 1 Tp. Therefore, even when large positional displacement or disturbance is caused over a plurality of the tracks, the phase difference can continuously be detected.

According to the aforementioned embodiments, the off-track position of the magnetic head can be controlled accurately based on the phase difference detected from the signals of the two preambles provided for the magnetic recording medium.

In the first and the second embodiments, the positioning control of the magnetic head and the correction of the clock signal are applied to the patterned media recording method where the magnetic recording media are used as the patterned media. However, the positioning control of the magnetic head and the correction of the clock signal can be applied to a disk read track recording method, in addition to the patterned media recording method.

In the first and second embodiments, the re-sync marks to synchronize timing are formed at the heads of the two preambles 32 and 33. However, the function of the re-sync mark may be replaced by the servo area to acquire the servo information so that the re-sync mark becomes unnecessary.

In the first and second embodiments, the two preambles 32 and 33 that are provided in the timing synchronization area 30 are formed to be adjacent to each other. However, the preambles 32 and 33 may be formed to be distant from each other.

In the first and second embodiments, the magnetic recording medium 10 forms the positive and negative magnetic dots which are disposed in a staggered shape and whose arrangement is inverted with respect to the axis of symmetry at the track center 17. However, any magnetic dot pattern can be used as long as the phase difference between the reproduction signals from the preambles 32 and 33 can be detected.

The various modules of the systems described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An information storage device, comprising:
    a magnetic storage medium comprising a magnetic recording layer comprising two preamble areas and a re-sync mark area, a plurality of magnetic bodies being in the preamble areas with a plurality of arrangements, the re-sync mark area being at a head of the preamble areas and indicating a start of the preamble areas;
    a magnetic head configured to read data from to the magnetic storage medium and to write data to the magnetic storage medium;
    a phase difference detector configured to receive signals from the preamble areas read by the magnetic head, and to detect a phase difference from the readout signals of the preamble areas;
    a displacement calculator configured to calculate a displacement of the magnetic head with respect to a track center based on the detected phase difference of the readout signals ; and
    a positioning module configured to control a position of the magnetic head in order to position the magnetic head at the track center based on the displacement of the magnetic head with respect to the track center.

2. The information storage device of claim 1, further comprising:
    a phase difference and displacement storage module configured to store the displacement of the magnetic head in association with the phase difference of the readout signals from the preamble areas,
    wherein the displacement calculator is configured to calculate the displacement based on the displacement in the phase difference and displacement storage module.

3. The information storage device of claim 1, wherein the magnetic bodies comprise magnetic particles, and the magnetic bodies are in a staggered pattern inverted with respect to an axis of symmetry at the track center.

4. The information storage device of claim 2, further comprising a clock signal calculator configured to compare the phase difference of the preamble areas detected by the phase difference detector, and to calculate a middle point of the phase difference as a clock signal corresponding to read timing or write timing of data.

5. A control device comprising:
    a phase difference detector configured to read signals from a magnetic storage medium comprising a magnetic recording layer comprising two preamble areas and a re-sync mark area, a plurality of magnetic bodies in the preamble areas with a plurality of arrangements, the re-sync mark area being at a head of the preamble areas and indicating a start of the preamble areas;

a displacement calculator configured to calculate a displacement of the magnetic head with respect to a track center based on the detected phase difference of the signals from the preamble areas; and a positioning module configured to control a position of the magnetic head in order to position the magnetic head at the track center based on the displacement of the magnetic head with respect to the track center.

6. The control device of claim 5, further comprising:

a phase difference and displacement storage module configured to store the displacement of the magnetic head in association with the phase difference of the readout signals from the preamble areas, wherein the displacement calculator is configured to calculate the displacement based on the displacement in the phase difference and displacement storage module.

7. The control device of claim 5, wherein the magnetic bodies comprise magnetic particles, and the magnetic bodies are in a staggered pattern inverted with respect to an axis of symmetry at the track center.

8. The control device of claim 6, further comprising a clock signal calculator configured to compare the phase difference of the preamble areas detected by the phase difference detector, and to calculate a middle point of the phase difference as a clock signal corresponding to read timing or write timing of data.

* * * * *